(12) United States Patent
Colgrave

(10) Patent No.: US 8,135,743 B2
(45) Date of Patent: Mar. 13, 2012

(54) REDIRECTING DOCUMENT REFERENCES TO A REPOSITORY

(75) Inventor: John Colgrave, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/504,342

(22) Filed: Jul. 16, 2009

(65) Prior Publication Data

US 2011/0225125 A1    Sep. 15, 2011

(51) Int. Cl.
*G06F 17/30* (2006.01)

(52) U.S. Cl. ................................................ 707/782

(58) Field of Classification Search .............. 707/689, 707/690, 691, 709, 782
See application file for complete search history.

(56) References Cited

U.S. PATENT DOCUMENTS

| | | | | |
|---|---|---|---|---|
| 6,338,082 | B1 * | 1/2002 | Schneider | 709/203 |
| 6,678,717 | B1 * | 1/2004 | Schneider | 709/203 |
| 6,895,433 | B1 * | 5/2005 | Slater et al. | 709/220 |
| 7,188,138 | B1 * | 3/2007 | Schneider | 709/203 |
| 7,194,552 | B1 * | 3/2007 | Schneider | 709/245 |
| 2005/0015512 | A1 | 1/2005 | Kale et al. | |
| 2005/0188383 | A1 * | 8/2005 | Alcazar et al. | 719/331 |
| 2006/0021004 | A1 * | 1/2006 | Moran et al. | 726/2 |
| 2007/0045416 | A1 * | 3/2007 | Paila et al. | 235/435 |
| 2007/0050707 | A1 | 3/2007 | Liu et al. | |
| 2008/0091843 | A1 * | 4/2008 | Kulkarni | 709/239 |
| 2008/0120412 | A1 * | 5/2008 | Icaza | 709/225 |
| 2008/0172404 | A1 * | 7/2008 | Cohen | 707/102 |
| 2009/0300012 | A1 * | 12/2009 | Levow et al. | 707/6 |

OTHER PUBLICATIONS

Van de Sompel, et al., "Using the OAI-PMH . . . Differently", D-Lib Magazine, Jul./Aug. 2003, vol. 9, No. 7/8.
"Persistent Identifier Scheme for Digital Collections at the National Library of Australia", www.nla.gov.au/initiatives/nlapi.html ', Apr. 6, 2008' 8 pages.

* cited by examiner

*Primary Examiner* — Cam-Linh Nguyen
(74) *Attorney, Agent, or Firm* — Novak Druce + Quigg LLP

(57) ABSTRACT

A method for automating the redirection of references that can include downloading an original document using an original uniform resource identifier (URI), storing the original document in a repository, parsing the original document to determine the existence of one or more dependent documents referred to in the original document and executing an automated redirection subprocess. The method can include parsing each dependent document to determine one or more dependent documents, and responsive to determining the existence of one or more dependent documents, conducting the automated redirection subprocess for each dependent document and further dependent document and repeating the parsing of dependent documents and conducting the automated redirection subprocess steps until all further dependent documents have been redirected.

12 Claims, 5 Drawing Sheets

REDIRECTING DOCUMENT REFERENCES TO A REPOSITORY

FIELD OF THE INVENTION

This invention relates to a service registry and repository system and method. In particular this invention relates to a service registry and repository system and method for redirecting document references to a repository.

BACKGROUND OF THE INVENTION

The core information technology (IT) systems for many businesses have been in service for many years—even decades. These systems were developed on and optimized for legacy platforms, and are difficult to link to new technologies such as Web services and service-oriented architecture (SOA). The convergence of SOA and mainframe technologies can help enterprises liberate these core business assets by making it easier to enrich, modernize, extend and reuse them well beyond their original scope of design.

A web service can be generally defined as one or more application functions that can be invoked over the Internet using a protocol. One example of a protocol that may be used in this context is the Simple Object Access Protocol (SOAP), which may be used by Internet-based application servers or web servers, to provide web services. SOAP is a protocol that is often used in the exchange of information in decentralized, distributed network environments. Typically, web services are self-contained and self-describing. For example, a web service may be a reusable application component that offers operations, such as currency conversion, weather reports or language translation. These components may be used by applications, which pass requests to the web service to perform its particular operation(s). Web services may also be used to exchange data between different applications and different platforms.

A service registry and repository is an application that manages service descriptions as data objects in a relational database system. Service descriptions are used by analysts, architects, and developers during the development phase of the SOA life cycle to locate services to reuse and to evaluate the impact of changes to service configurations. Typically a user uses a graphical tool to design classes that represent the service descriptions that need to be managed or maintained. For example, Java objects that represent the classes are compiled into binary files. A database schema is generated that can represent the objects and is installed into a relational database. The service registry and repository registers and stores service descriptions as part of a SOA promising business agility and resilience through reuse, interoperability, integration and governance. These promises are addressed by separating service descriptions from their implementations, and using the service descriptions across the life cycle of the service. Standards-based service metadata artifacts, such as Web Service Definition Language (WSDL), XML schema, policy or Service Component Architecture (SCA) documents, capture the technical details of what a service can do, how it can be invoked, or what it expects other services to do. Semantic annotations and other metadata can be associated with these artifacts to offer insight to potential users of the service on how and when it can be used, and what purposes it serves.

WSDL is a language based on extensible Markup Language (XML) that is used to describe how to communicate with web services. WSDL defines services as collections of network endpoints, or ports. A WSDL document is an XML document that describes a web service, including the web service ports and messages. A port is defined by associating a network address with a reusable binding, and a collection of ports define a service. Messages are abstract descriptions of the data being exchanged, and port types are abstract collections of supported operations. The concrete protocol and data format specifications for a particular port type constitutes a reusable binding, where the messages and operations are then bound to a concrete network protocol and message format. In this way, WSDL describes the public interface to the web service.

WSDL is typically used in combination with SOAP (Service Oriented Architecture Protocol) and XML schema to provide web services. A client program connecting to a web service can read the web service's WSDL file to determine what functions are available. Any special data types are embedded in the WSDL file in the form of XML schema. The client can then use SOAP to actually call one of the functions listed in the WSDL file.

With an SOA, an inventory of structured, loosely coupled services that perform a single function can be choreographed to build business processes—yet the underlying implementation is isolated from the consumer. The user of the service is only aware of the function being performed, not of the details of how the function is implemented. With this service model in place, IT can rapidly add new functions and modify existing processes by simply assembling the services required to meet the new or enhanced business process model.

Furthermore, different applications from different sources can communicate with each other without extensive custom coding, and web services are not associated with any one operating system or programming languages. This flexibility allows more sophisticated business-to-business applications as well as more sophisticated browsing models (with more client-side processing of data) to be developed.

While the business benefits of SOA are clear—increased business flexibility, faster application development turnaround time and economical code reuse—SOA creates more moving parts for IT organizations to keep track of, monitor and govern. That implication affects both developers and production personnel. Managing a few services with limited exploitation is usually no problem; however, managing tens or hundreds of services through application lifecycles across production systems requires significant organization. SOA-based applications can call services through an enterprise service bus (ESB), which can dynamically choose services based on specific needs, operational characteristics and service level agreements. In turn, services can call other services and applications may follow a different path each time they run. As a result, the ability to stay on top of the details can quickly become very difficult unless there are effective organizational tools.

The requirement that all external identifiers in XML documents must provide a system identifier has unquestionably been of tremendous short-term benefit to the XML community. It has allowed a whole generation of tools to be developed without the added complexity of explicit entity management. However, the interoperability of XML documents has been impeded in several ways by the lack of entity management facilities. External identifiers may require resources that are not always available. For example, a system identifier that points to a resource on another machine may be inaccessible if a network connection is not available. External identifiers may require protocols that are not accessible to all of the vendors' tools on a single computer system.

WSDL is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. If a direct association between an XML file and an XML schema or DTD file is created, then for any change to the location of the schema or DTD, all of the referencing XML files must be tracked down and updated with the new location of the DTD or schema. XML documents typically refer to external entities. These external relationships are expressed using URIs, typically as URLs. However, if they are absolute URLs, they only work when the network can be reached. Relying on remote resources makes XML processing susceptible to both planned and unplanned network downtime. Conversely, if they are relative URLs, they are only useful in the context where they were initially created. The XML catalog is a document describing a mapping between external entity references and locally-cached equivalents.

There especially exists a challenging problem regarding how to govern documents such as WSDL and XSD documents yet make them accessible to development and other tools. Some schemas, such as that for XML itself, are defined to be available at an absolute address on the Internet. For example, in the case of the schema for XML, it is available at http://www.w3.org/2001/xml.xsd. There are several potential problems with always accessing a schema with an absolute address on the Internet. One is that the network connection or the server may be unavailable. Another is that the file may be replaced with a newer version and this could break any existing files that reference the file that was changed.

To avoid these issues, current techniques include requiring developers/users to download copies of such files to their local computer but this requires that users downloading a copy have to either change their own files to refer to the downloaded file in its local location or they have to manually map the original reference to a reference to the local copy. This approach also has the problem that if the original file is updated then everybody that has downloaded their own copy has to download the new copy.

SUMMARY OF THE INVENTION

Embodiments of the present invention provide a method, system and computer program product for automating the redirection of references. The method can include downloading an original document using an original uniform resource identifier (URI), storing the original document in a repository, parsing the original document to determine the existence of one or more dependent documents referred to in the original document and executing an automated redirection subprocess. The automated redirection subprocess can include downloading and storing each dependent document from the respective original URI of each dependent document responsive to determining the existence of one or more dependent documents, assigning a new URI to the original document and each dependent document stored in the repository, creating a catalog entry for the original document and each dependent document. For each catalog entry, the corresponding original URI can be remapped to the assigned new URI. Furthermore, the method can include parsing each dependent document to determine one or more further dependent documents, and responsive to determining the existence of one or more further dependent documents, conducting the automated redirection subprocess for each dependent document and further dependent document and repeating the parsing of dependent documents and conducting the automated redirection subprocess steps until all further dependent documents have been redirected.

In another embodiment, a data processing system configured for automating the redirection of references can be provided. The system can include a processor configured for execution in a host computing platform, a repository configured for storing documents, remapping program code coupled to the processor, causing the processor to execute the redirection of references method above.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automating the redirection of references to documents to controlled copies held in a repository by utilizing an XML catalog. The method can include downloading an original document using an original uniform resource identifier (URI), storing the original document in a repository, parsing the original document to determine the existence of one or more dependent documents referred to in the original document, and executing an automated redirection subprocess. The subprocess can include parsing through a whole 'tree' of documents. Each document can be treated as a node in the tree and responsive to determining the existence of one or more dependent documents, the subprocess can include downloading and storing each dependent document from the respective original URI of each dependent document, assigning a new URI to the original document and each dependent document stored in the repository, and creating a catalog entry for the original document and each dependent document. For each catalog entry, the subprocess can include remapping the corresponding original URI to the assigned new URI. Each dependent document can be parsed to determine one or more further dependent documents, and responsive to determining the existence of one or more further dependent documents, the automated redirection subprocess can be further conducted for each dependent document and further dependent document by repeating the parsing of dependent documents and conducting the automated redirection subprocess steps until all further dependent documents have been redirected, essentially until all documents in the 'tree' are processed.

Figure 1:
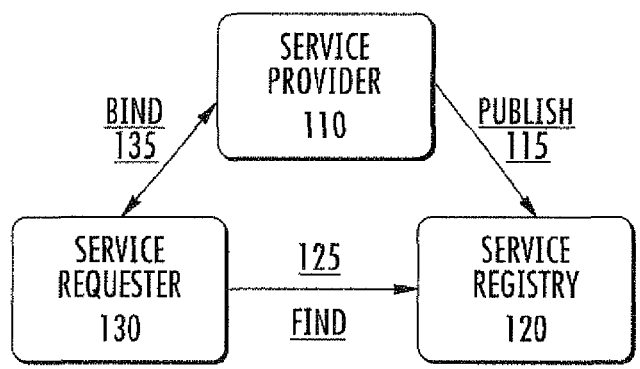
FIG. 1 is a schematic illustration of a services-oriented architecture (SOA)

A service-oriented architecture is illustrated in FIG. 1. A service provider 110 defines a service description for a Web service and publishes it to a service registry 120, as depicted by arrow 115. A service requester 130 at a client computer utilizes a find operation, represented by arrow 125, to retrieve the service description from the registry and use the service description to bind with the service provider 110, as represented by arrow 135, and to invoke or interact with the Web service implementation. To facilitate this architecture, the client connects to a router (not shown) at the service provider's server. The connection between the client computer and the router is established via the Internet, but other connections can be used. It can be appreciated that the client computer can connect to the Internet via telephone modem, cable modem, LAN, WAN, T1 or any other means.

The IBM WebSphere WSRR is a master metadata repository for service definitions. Such service definitions include traditional internet services that implement WSDL and XSD interfaces with SOAP/HTTP (simple object access protocol and hypertext transfer protocol) as well as a broad range of SOA services that can be described using WSDL, XSD and policy declarations. The service definitions might use a range of protocols and be implemented according to a variety of programming models.

Figure 2:
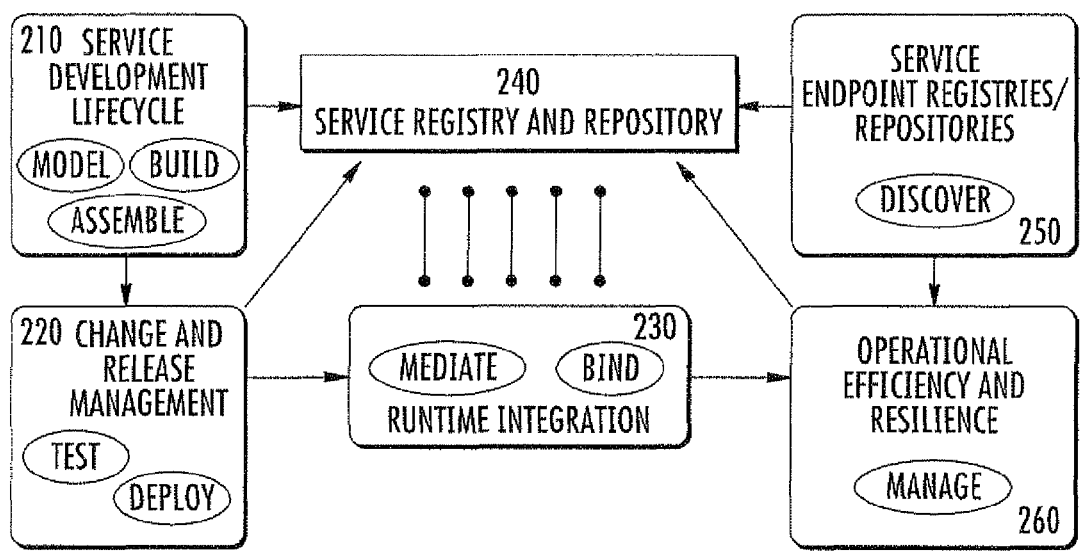
FIG. 2 is a schematic illustration of a web-based service registry and repository (WSRR) illustrating the phases in a service life cycle.

FIG. 2 is a schematic illustration of a WSRR illustrating the phases in a service life cycle. WSSR manages web services and shared business processes across a four stage lifecycle: discovery 250, service development 210, change and release management 220, and operational efficiency and resilience 260. As the integration point for service metadata, WSRR 240 establishes a central point for finding and managing service metadata acquired from a number of sources, including service application deployments and other service metadata and endpoint registries and repositories, such as Universal Description, Discovery, and Integration (UDDI). The WSRR 240 is where service metadata that is scattered across an enterprise is brought together to provide a single, comprehensive description of a service. Once this happens, visibility is controlled, versions are managed, proposed changes are analyzed and communicated, usage is monitored and other parts of the SOA foundation can access service metadata with the confidence that they have found the copy of record.

In the discovery phase 250, services ready for harvesting into the SOA lifecycle are discovered from other registries or deployed environments. The service development phase 210 includes modeling, building, assembling and reusing services that could serve as building blocks for new composite applications. The change and release management phase 220 includes governing deployed services to ensure changes are authorized and service integrity is maintained. Managing information that enables dynamic binding of service requestors to service providers is implemented at runtime integration 230. Runtime integration allows the infrastructure to enforce registered policies. In the operational efficiency and resilience phase 260, efficiency can be managed by providing detailed information about service interaction endpoints being monitored.

Figure 3:
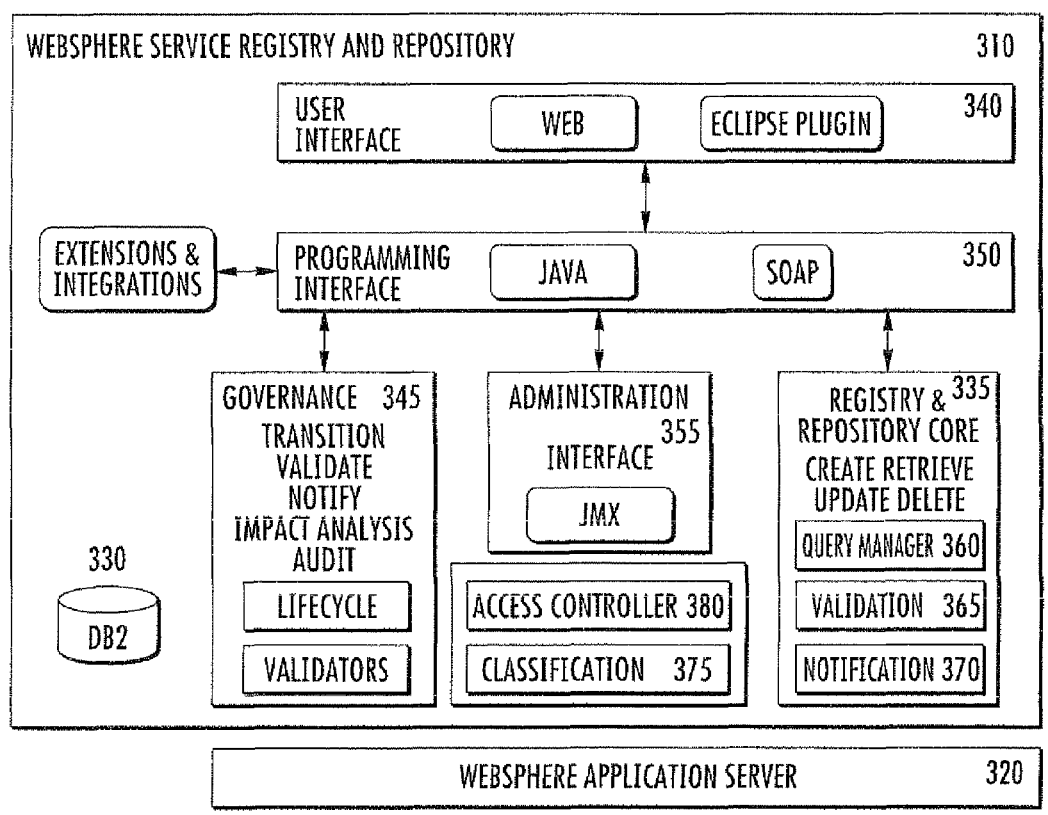
FIG. 3 is a schematic illustration of an architecture of WSRR.

Referring to FIG. 3, WSSR 310 can be a Java™ 2 Platform Enterprise Edition (J2EE) application that runs on an application server 320 and uses a relational database 330 as a backing store for service metadata persistence. As such, it takes advantage of the role-based access control provided by the application server 320 so that role-based views and access control can be turned on when WSRR 310 is deployed as an enterprise-wide application. The top level components of WSRR 310 include a registry and repository core 335, a governance component 345, an administration interface 355, a user interface 340, and a programming interface 350. (Java and all Java-based trademarks are trademarks of Sun Microsystems, Inc. in the United States and other countries.)

The registry and repository core 335 offers both registry function and repository function for service metadata. The repository function allows users to store, manage and query service metadata artifacts holding service descriptions (WSDL, XSD, WS-Policy, SCDL or XML documents). The registry and repository core 335 not only maintains the documents containing service metadata, but it also provides a fine-grained representation of the content of those documents (for example, ports and portTypes in WSDL documents). The registry function makes provision for registered service declarations and elements of the derived content models with user-defined properties, relationships, and classifiers. The registry and repository core 335 provides a rich query interface 360 that makes use of those declarations when a search is performed to find entities such as a service endpoint or service interface.

Whenever a change to registry or repository content is detected by registry and repository core 335, it invokes all validation and notification functions that are registered in the validation register 365 and the notification register 370. Both kinds of functions are considered extension mechanisms that can be used to customize how WSRR 310 reacts to changes. Validation function 365 can be written and registered so that the registry and repository core 335 will execute when changes are made to the content, for example, a validation function that checks for completeness of a service definition. Notification functions can be written and registered to communicate changes to the content of the repository.

Through the governance component 345, WSRR 310 supports a rich set of extensible governance functions, including the ability to model service life cycles for governed entities, define valid transitions between service states, write and plug-in validators to guard the transitions between states, and designate (notification) actions to be taken as result of the transition. It also provides interfaces to analyze the impact of changes to WSRR content, and provides auditing of such changes.

The classification component 375 allows service descriptions and parts of service definitions to be annotated with corporate vocabulary and to capture the governance state. WSRR classification systems are captured in Ontology Web Language (OWL) documents that are loaded into WSRR 310 using the administrative interface 355. WSRR entities can be classified with values from these classification systems, which allow classification-based queries to be performed, and access restricted based on classification.

The access controller 380 supports a fine-grained access control model that allows for the definition of which user roles can perform specific types of actions on corresponding artifacts. Visibility of services can be restricted by business area, and user roles can be restricted from transitioning services to certain life cycle states. This is in addition to the role-based access control provided by the application server 320. The administration interface 355 supports the import and export of WSRR content for exchange with other WSRR repositories and provides a JMX-based API for registry and repository configuration and basic administration. These support interactions with the access controller 380 and with the classification component 375.

A web-based user interface 340 includes a web interface and an eclipse plugin interface to enable interaction with WSRR 310. The web interface 340 supports all user roles, offering lookup, browse, retrieve, publish, and annotate capabilities, as well as governance activities, such as import/export and impact analysis. The web-based user interface 340 can also be used for performing service metadata management and governance.

A programming interface 350 uses Java and SOAP application programming interfaces (APIs) to interact programmatically with the registry and repository core 335. These APIs provide governance operations, and a flexible query capability. The SOAP API is used to communicate content using XML data structures. The Java API is used to communicate content using service data object (SDO) graphs. Using either the web-based user interface 340 or the programming interface 350, documents and concepts managed by WSRR 310 can be created, retrieved, updated and deleted.

WSRR 310 supports a Java-based API and a SOAP-based API that can be used to interact with the registry and repository core 335, the governance component 345 and the administration interface 355. Both APIs support publishing (creating and updating) service metadata artifacts and metadata associated with those artifacts, retrieving service metadata artifacts, deleting the artifacts and their metadata, and querying the content of the registry and repository 335. The programming APIs use SDOs to capture the data graphs inherent in the content model, allowing access to physical documents, logical parts of the physical documents, and concepts. The SOAP API uses XML documents to similarly represent SDOs to communicate content structures in both physical and logical models.

An XPath expression identifies the type of managed entity to be returned and filters that capture the managed elements related to the desired object. XPath expressions are used to perform searches with the query interface 360 for coarse and fine-grained queries. Queries can be performed using semantic annotations, properties, and all or parts of physical service metadata artifacts. Fragments of metadata can be returned (such as endpoints), all metadata can be returned, and both metadata and documents can be returned. In addition to "free-form" XPath-based queries, a set of pre-defined queries are available to use to address common paths through the WSRR content model. The governance component 345 allows analysis of the impact of changes to specific artifacts through an API. In addition one can use governance operations to request life cycle transitions for a governed entity as well as the configuration of e-mail notifications for users interested in specific content changes.

The administration interface 355 provides an API that supports basic configuration and loading and managing of metadata in support of repository content, such as classification and life cycle management. The administration API 355 enables loading definitions of state machines to be used to model the life cycle of governed entities. In addition, the administration API 355 supports registration of plug-ins for validation functions or additional notification functions.

Figure 4:
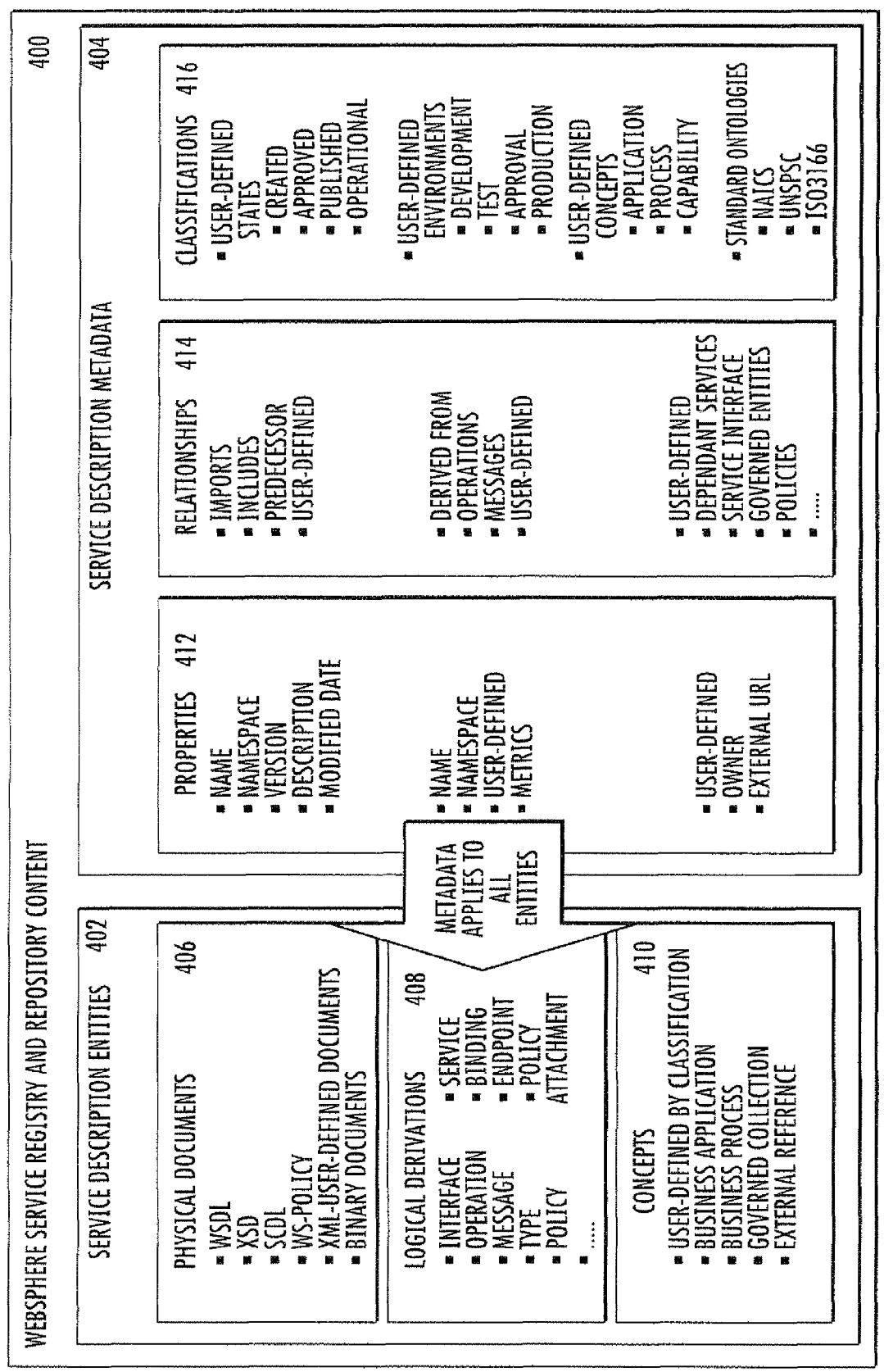
FIG. 4 is a schematic illustration of a WSRR content model.

Referring to FIG. 4, a description of the WSRR content model 400 is provided. Broadly, the content model has entities representing service description entities 402 and service description metadata 404. All artifacts have a WSRR-assigned URI, a name and a description. Examples of each type of artifact are shown within the boxes in FIG. 4 but are not necessarily referred to in the description. Service description entities 402 stored and managed in the registry and repository include physical documents 406; logical derivations 408 and concepts 410. Physical documents 406 are XML documents that are known as service metadata artifacts. Logical derivations 408 are the finer-grained pieces of content that result when some types of a physical document are shredded as they are loaded into the registry and repository. Concepts 410 are generic entities that are usually typed, and represent anything that is not represented by a document in the registry and repository. All three types of service description entities can be used in queries, have service annotations applied, and have relationships established from and to them.

The most elemental building blocks for the WSRR are the physical documents 406 such as XSD, WSDL Policy documents. In addition any XML service metadata artifact type or binary document can be stored in WSRR and receive the benefits of broader visibility, reuse, management, and governance. The coarse-grained model made up from registry objects that represents those documents is referred to as the physical model. Documents are versionable objects in the WSRR content model, which means that in addition to a URI, name, and description, they also have a version property.

For some of the physical document types, WSRR derives logical objects and stores them in logical derivations 408. For some physical document types, WSRR defines predefined properties and detects relationships to other physical documents. An XSD document, for example, has a target Namespace property and the relationships with other imported XSD documents, other redefined XSD documents and other included XSD documents. When an entry for a certain physical document is created in WSRR, it is analyzed for relationships to other artifacts. If not already represented in WSRR, a related artifact is also added, and in either case the relationship between the artifacts is recorded.

The logical model of WSRR has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. WSRR stores other types of service metadata using the XML Document, a generic document type.

WSRR uses a concept to represent anything that does not have a physical document. Concepts 410 are used to represent a reference to content in some other metadata repository, such as a portlet in a portlet catalogue or an asset in an asset repository. It can also be used to group physical artifacts together to govern them as a unit; for example, concepts can be versioned.

In addition to content directly related to entities 402, WSRR supports a number of metadata types that are used to describe entities 402. These metadata types are referred to as service description metadata 404. WSRR supports three types of service semantic metadata types: properties 412, relationships 414, and classifications 416. All three types describe physical model entities, logical model entities, and/or concepts. For example, service description metadata can be used to associate a property "businessValue" with a physical model entity representing a WSDL file. It might also be used to define a new relationship "makesUseOf" between an entity in the logical model representing a "portType" and an entity in the physical model representing an XML document. Furthermore one could create a classification of "importantThings" and associate it with a "port" entity in the logical model and with an entity in the physical model representing a "Policy" document. This enables semantic queries to target individual elements of the service metadata, and meaningful dependency analyses to take place prior to making changes.

Properties 412 are simple name/value pairs that are associated with any of the service description entities 402. Some properties are assigned by the system, such as the unique ID, the owner, and the last time the service entity was changed.

These system-assigned properties cannot be changed. Others are derived through the "shredding" of a key-type service description document into its logical model. Properties of this type include name and namespace. Sometimes these system-assigned values are allowed to be changed and properties can be created. Such a user-defined property can be used as a simple, unstructured and untyped extension mechanism. Properties 412 can be used in queries, and can be used to establish fine-grained access control.

Relationships 414 tie together one source service description entity to one or more target service description entities. Every relationship is given a name and a source is only allowed to have a single relationship with a given name. The relationship established between XSD documents based on the importing of one into the other is one such system-assigned relationship. Relationships can also be user defined. For example, a user can: relate a concept that represents an external object to a service using a user defined relationship; relate all of the service description documents that will be governed as a unit to a governable entity; and/or relate a monitoring policy to a service endpoint.

A user can load classifications 416 into WSRR where they can then be used to apply semantic meaning to service description entities 402. Classification systems are documents encoded using the Ontology Web Language (OWL). WSRR represents OWL Classes as classifiers and interprets the subTypeOf relationship between those Classes as establishing a classifier hierarchy. Other OWL concepts such as data or relationship representing properties or other built-in OWL relationships are ignored. Updates are done by importing a modified version of the ontology. Any Class in the underlying ontology can be used as a classification; the same classification can be used to classify multiple entities and an entity can be associated with multiple classifications.

In one embodiment of the invention, an XML catalog can be created to remap URI references for published schema documents. Essentially, by automating the redirection of URI references to documents to controlled copies that are held in a repository, multiple users can share the master copy of a document held in the repository yet they will automatically pick up an updated document. Thus, publishing a new version of a document will not affect users of the previous version of the document. Additionally, the content of the documents can be altered when the documents are saved to a repository and any import statements rewritten to reflect the new URIs assigned to the documents. Traditionally, this would not work if the original documents had been digitally signed as the digital signature would be invalidated. This would also mean that the documents had to be updated whenever they were moved between instances of a registry, such as from development into test. One advantage of this present invention is that the documents themselves do not change, only the associated XML Catalogs do.

In one implementation, an XML Catalog (http://www.oasis-open.org/committees/download.php/14810/xmlcatalogs.pdf) can be automatically generated for each WSDL and XSD document published to a repository, and the XML Catalog file for each other document that the published document depends on can be automatically associated with it. The XML Catalog standard defines a way to map one URI reference to a resource to another URI reference. As an example, the way that another schema file typically refers to the schema for XML is through the URI reference "http://www.w3.org/2001/xmLxsd." However, if this file is loaded into a repository to provide additional control over when a new version of that file is adopted, it will have a different URI, assuming the repository provides a way to retrieve documents by dereferencing URIs. Assuming that the new URI for this document is "http://registry.com/uri1," if a user wanted to load a schema into a development tool, or other tool, and automatically retrieve the correct version of the schema for XML from the repository, but they did not want to change their schema to refer to the new URI "http://registry.com/uri1", the present invention can provide an XML catalog to re map the old URI "http://www.w3.org/2001/xmLxsd" to the new URI "http://registry.com/uri1."

The XML Catalog could be generated automatically when the XML schema document is published to the repository. The original URI of the XML schema document would have to have been presented to the repository in order to load the actual file into the repository, and the repository can associate the new URI assigned to the document in order to generate the appropriate XML Catalog. This catalog can be associated with the document so that it is never necessary to retrieve the schema document itself. All that is necessary is to retrieve the catalog file which will contain the correct URI to refer to the schema document in the repository. This approach can be extended to deal with dependencies between documents as XML Catalogs can refer to other catalogs. Taking the UDDI V3 schema as an example, it imports the schema for XML using the following statement <xsd:import namespace="http://www.w3.org/XML/1998/namespace" schemaLocation="http://www.w3.org/2001/xml.xsd"/>.

The UDDI schema is available at "http://uddI.org/schema/uddI.v3.xsd." If the UDDI schema was published to the repository, and given a new URI "http://registry.com/uri2", in the present invention, it would have an XML Catalog created and associated with it that remapped "http://uddI.org/schema/uddI.v3.xsd" to "http://registry.com/uri2." Without the present invention, the reference to the XML schema would be resolved by retrieving the document from "http://www.w3.org/" which is not what is desired.

With the present invention, the XML Catalog for the UDDI schema can refer to the XML Catalog for the XML schema in order to parallel the relationship between the two documents themselves. By doing this, when the UDDI schema file is parsed, the second XML Catalog will be processed automatically and the remapping from "http://www.w3.org/2001/xm.xsd" to "http://registry.com/uri1" will automatically happen so the XML schema file will be retrieved from the repository and not from the Internet.

Figure 5:
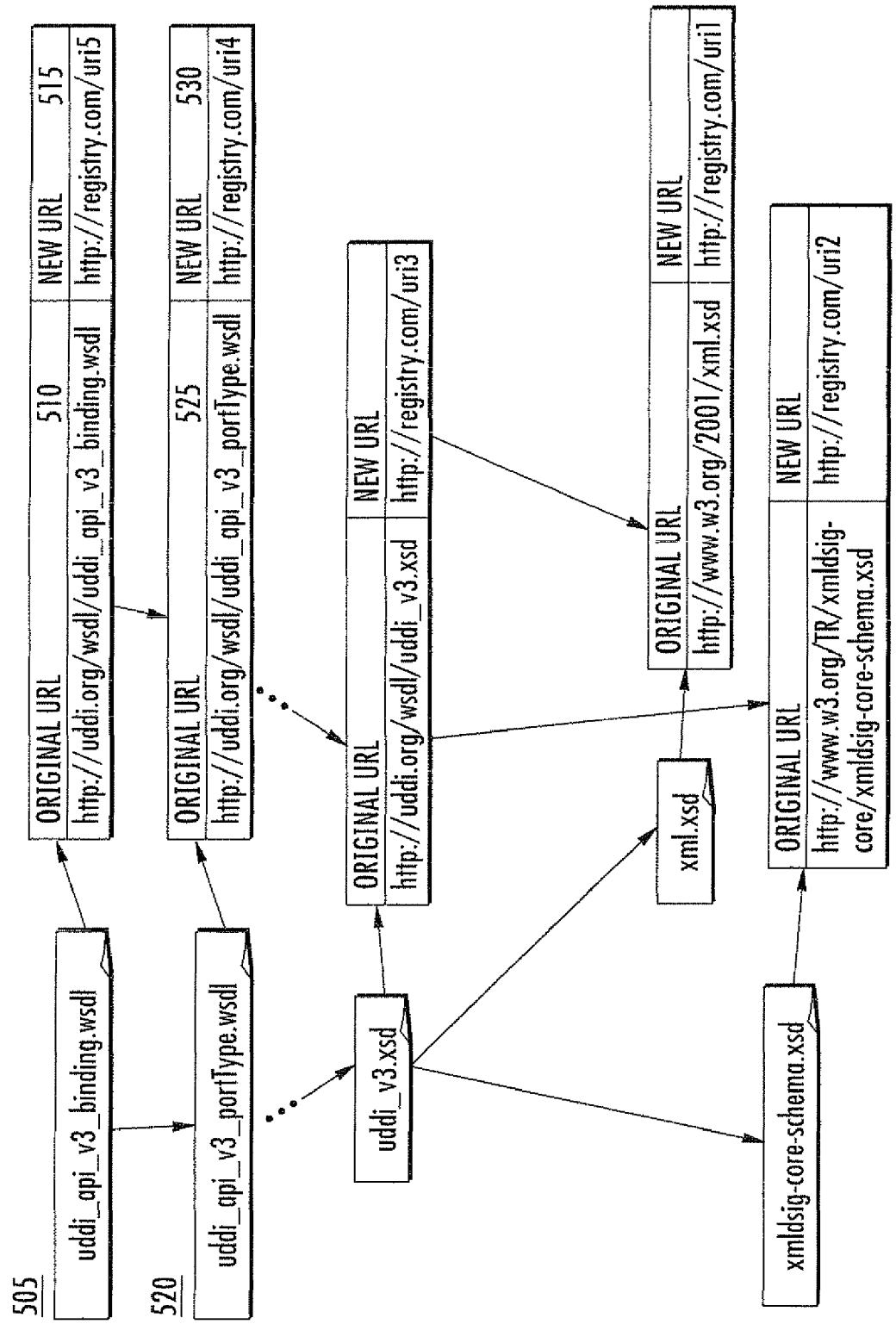
FIG. 5 is a block diagram illustrating the remapping of URI references.

FIG. 5 is a block diagram illustrating a remapping of URI references in a preferred embodiment of the invention. An original schema document 505 "uddi_api_v3_binding.wsdl" having an original URI reference 510 "http://uddi.org/wsdl/uddi_api_v3_binding.wsdl" is loaded from the internet into the repository and assigned a new URI reference 515 such as "http://registry.com/uri5." If a developer wants to generate a Java interface from the original schema document 505, the following steps would occur: retrieve the set of XML Catalog files starting with the one related to the original schema document 505 "uddi_api_v3_binding.wsdl" and then begin to parse the original URI reference 510 "http://uddi.org/wsdl/uddi_api_v3_binding.wsdl." The parser looks in the first XML Catalog entry and determines that the original URI 510 "http://uddi.org/wsdl/uddi_api_v3_binding.wsdl" is remapped to a new URI 515 "http://registry.com/uri5." Thus the original schema document 505 is retrieved from the new URI 515 "http://registry.com/uri5" location, obtaining the version of the schema document being managed by the repository.

When the import of a second document 520 "uddi_api_v3_portType.wsdl" is encountered in the first document 505, the original URI reference 525 for the second document 520 is parsed. The parser will look to the second XML Catalog entry and determine that the original URI 525 "http://uddi.org/wsdl/uddi_api_v3_portType.wsdl" is remapped to a new URI 530 "http://registry.com/uri4." Thus the second document 520 will be retrieved from the new URI 530 ""http://registry.com/uri4." The obtained version of the second document 520 "uddi_api_v3_portType.wsdl" is the governed version located in the repository. The same processing is applied every time a reference or multiple references to another document is encountered, and the end result is that all of the files are retrieved automatically from the repository without the developer having to get the most updated version of the documents or having to change the original URI references.

Figure 6:
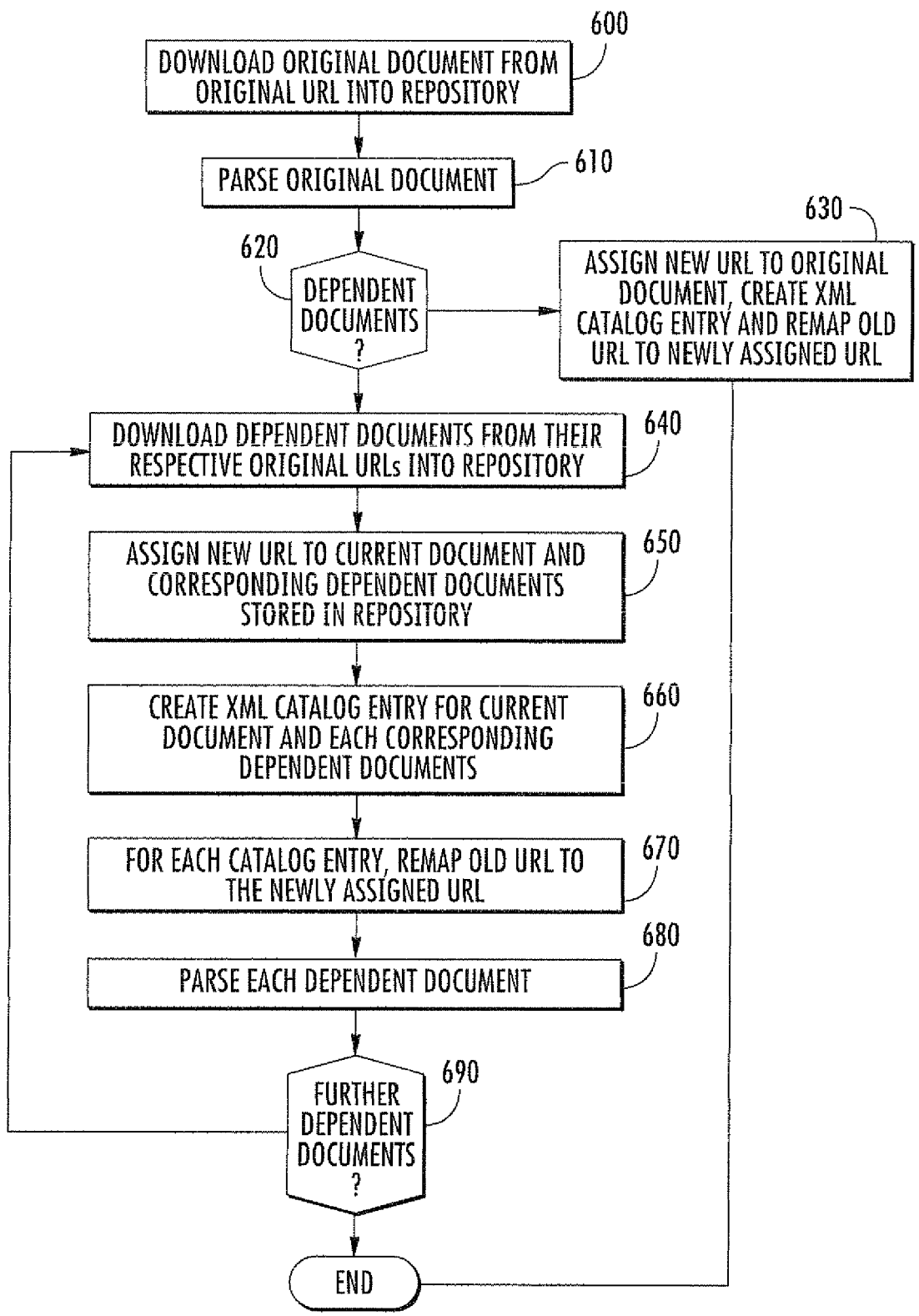
FIG. 6 is a flow chart illustrating a WSRR process according to the invention.

FIG. 6 is a flow chart illustrating a process of the preferred embodiment of the invention. In block 600, an original document such as "uddi_api_v3_binding.wsdl" from the original URI such as "http://uddi.org/wsdl/uddi_api_v3_binding.wsdl" is downloaded into a repository. In block 610, the original document is parsed to determine one or more dependent documents imported or referred to in the original document. In decision block 620, it is determined whether there are one or more dependent documents. For example, if the import of dependent document "uddi_api_v3portType.wsdl" is encountered in the original document "uddi_api_v3_binding.wsdl", then the dependent document is downloaded from its original URI such as ""http://uddi.org/wsdl/uddi_api_v3_portType.wsdl" as indicated in block 640. If there are no dependent documents, the process proceeds with block 630 in which a new URI is assigned to the original document that is stored in the repository. Additionally, an XML catalog entry is created and the old URI is remapped to the newly assigned URI.

In block 650, a new URI such as "http://registry.com/uri5" is assigned to the current document "uddi_api_v3_binding.wsdl", and a new URI is assigned to each dependent document. For example, a new URI ""http://registry.com/uri4" is assigned to the dependent document "uddi_api_v3_portType.wsdl" as previously shown in blocks 520, 525, and 530 of FIG. 5. In block 660, an XML catalog entry for the current document "uddi_api_v3_binding.wsdl" and each dependent document is created. In block 670 for each catalog entry, the old URI is remapped to the new URI as previously shown in FIG. 5. In block 680, each dependent document is parsed to determine one or more further dependent documents imported in each dependent document. In decision block 690, it is determined whether there are one or more further dependent documents referred within each dependent document. If there are further dependent documents, the process beginning at 640 can repeat by downloading the further dependent documents from their respective original URIs into the repository, and following blocks 650 through 680 for each of the further dependent documents referred within each dependent document.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A computer-implemented method of automating the redirection of uniform resource identifier (URI) references of documents, the method comprising:
    downloading a document using a URI;
    storing the document in a repository;
    parsing the document to determine the existence of one or more dependent documents referred to in the document; and
    conducting an automated URI reference redirection subprocess for the document and the dependent documents, the URI reference redirection subprocess comprising:
        responsive to determining the existence of one or more dependent documents, downloading each dependent document from a respective URI of each dependent document and storing the dependent document in the repository;
        assigning a new URI to the document and each dependent document stored in the repository;
        creating a catalog entry for the document and each dependent document; and
        for each catalog entry, remapping the URI from which each document was downloaded to the assigned new URI.

2. The method of claim 1, wherein the document comprises a schema document selected from the group consisting of XML documents, XSD documents, and WSDL documents.

3. The method of claim 1, wherein the dependent document comprises a Web Service Definition Language (WSDL) document.

4. The method of claim 1, wherein the catalog entry is within an XML catalog.

5. The method of claim 1, comprising:
    parsing each dependent document to determine one or more dependent documents;

responsive to determining the existence of one or more dependent documents, conducting the automated URI reference redirection subprocess to each dependent document; and repeating the parsing and conducting steps until all URI references have been redirected.

6. A data processing system configured for automating the redirection of uniform resource identifier (URI) references of documents, the system comprising:

a processor configured for execution in a host computing platform;

a repository configured for storing documents; and a remapping program code coupled to the processor, causing the processor to:

download a document using a URI, store the document in a repository;

parse the document to determine the existence of one or more dependent documents referred to in the document; and conduct an automated URI reference redirection subprocess for the document and the dependent documents, the URI reference redirection subprocess comprising:

responsive to determining the existence of one or more dependent documents, downloading each dependent document from a respective URI of each dependent document and storing the dependent document in the repository;

assigning a new URI to the document and each dependent document stored in the repository;

creating a catalog entry for the document and each dependent document; and for each catalog entry, remapping the URI from which each document was downloaded to the assigned new URL.

7. The system of claim 6, wherein the remapping program code coupled to the processor causes the processor to:

parse each dependent document to determine one or more dependent documents;

responsive to determining the existence of one or more dependent documents, conduct the automated URI reference redirection subprocess to each dependent document; and repeat the parsing and conducting steps until all URI references have been redirected.

8. A computer-readable storage medium having stored therein computer-readable instructions, which, when loaded in and executed by a computer causes the computer to perform the steps of:

downloading a document using a uniform resource identifier (URI);

storing the document in a repository;

parsing the document to determine the existence of one or more dependent documents referred to in the document; and conducting an automated URI reference redirection subprocess for the document and the dependent documents, the URI reference redirection subprocess comprising:

responsive to determining the existence of one or more dependent documents, downloading each dependent document from a respective URI of each dependent document and storing the dependent document in the repository;

assigning a new URI to the document and each dependent document stored in the repository;

creating a catalog entry for the document and each dependent document; and for each catalog entry, remapping the URI from which each document was downloaded to the assigned new URI.

9. The computer-readable medium of claim 8, wherein the document comprises a schema document selected from the group consisting of XML documents, XSD documents, and WSDL documents.

10. The computer-readable medium of claim 8, wherein the dependent document comprises a Web Service Definition Language (WSDL) document.

11. The computer-readable medium of claim 8, wherein the catalog entry is within an XML catalog.

12. The computer-readable medium of claim 8, wherein the computer-readable instructions, which, when loaded in and executed by the computer causes the computer to perform the steps of:

parsing each dependent document to determine one or more dependent documents;

responsive to determining the existence of one or more dependent documents, conducting the automated URI reference redirection subprocess to each dependent document; and repeating the parsing and conducting steps until all URI references have been redirected.

* * * * *